United States Patent [19]
Cherabuddi

[11] Patent Number: 5,829,010
[45] Date of Patent: Oct. 27, 1998

[54] APPARATUS AND METHOD TO EFFICIENTLY ABORT AND RESTART A PRIMARY MEMORY ACCESS

[75] Inventor: Rajasekhar Cherabuddi, Sunnyvale, Calif.

[73] Assignee: Sun Microsystems, Inc., Mountain View, Calif.

[21] Appl. No.: 657,817

[22] Filed: May 31, 1996

[51] Int. Cl.$^6$ ................................................ G06F 13/00
[52] U.S. Cl. .................. 711/100; 711/117; 711/118; 711/119; 711/120; 711/121; 711/122; 711/131; 711/138; 711/167
[58] Field of Search ................................ 711/100, 117, 711/118, 119, 120, 121, 122, 131, 138, 154, 167

[56] References Cited

U.S. PATENT DOCUMENTS

| | | | |
|---|---|---|---|
| 3,705,388 | 12/1972 | Nishimoto | 340/172.5 |
| 4,370,710 | 1/1983 | Kroft | 364/200 |
| 4,583,163 | 4/1986 | Kobayashi et al. | 364/200 |
| 4,755,933 | 7/1988 | Teshima et al. | 364/200 |
| 4,853,846 | 8/1989 | Johnson et al. | 364/200 |
| 5,023,776 | 6/1991 | Gregor | 364/200 |
| 5,113,515 | 5/1992 | Fite et al. | 395/425 |
| 5,276,848 | 1/1994 | Gallagher et al. | 395/425 |
| 5,377,341 | 12/1994 | Kaneko et al. | 395/425 |
| 5,392,441 | 2/1995 | Brasher et al. | 395/725 |
| 5,420,991 | 5/1995 | Konigsfeld et al. | 395/375 |
| 5,454,093 | 9/1995 | Abdulhafiz et al. | 395/460 |
| 5,455,925 | 10/1995 | Kitahara et al. | 395/449 |
| 5,488,709 | 1/1996 | Chan | 395/445 |
| 5,584,012 | 12/1996 | Kojima et al. | 395/449 |
| 5,606,684 | 2/1997 | Nakano et al. | 395/441 |
| 5,623,622 | 4/1997 | Yuki et al. | 395/427 |
| 5,623,628 | 4/1997 | Brayton | 395/468 |
| 5,664,223 | 9/1997 | Bender et al. | 395/842 |
| 5,724,533 | 3/1998 | Kuslak et al. | 395/381 |

Primary Examiner—Meng-Ai T. An
Assistant Examiner—Valerie Darke
Attorney, Agent, or Firm—Flehr Hohbach Test Albritton & Herbert LLP; William S. Galliani

[57] ABSTRACT

Primary memory access times are improved through an efficient technique of aborting and restarting primary memory accesses. A central processing unit of a computer includes an external cache controller to selectively generate an external cache free signal and an external cache busy signal. The central processing unit also includes a primary memory controller with an abort buffer. The primary memory controller includes circuitry to abort a primary memory access in response to the external cache busy signal. The data segment retrieved prior to aborting the primary memory access is stored in the abort buffer. The primary memory controller restarts the primary memory access in response to the external cache free signal. The restarting operation results in the data segment being passed to the external cache controller. Thereafter, the remaining data associated with the primary memory access is retrieved and sent to the external cache controller.

12 Claims, 5 Drawing Sheets

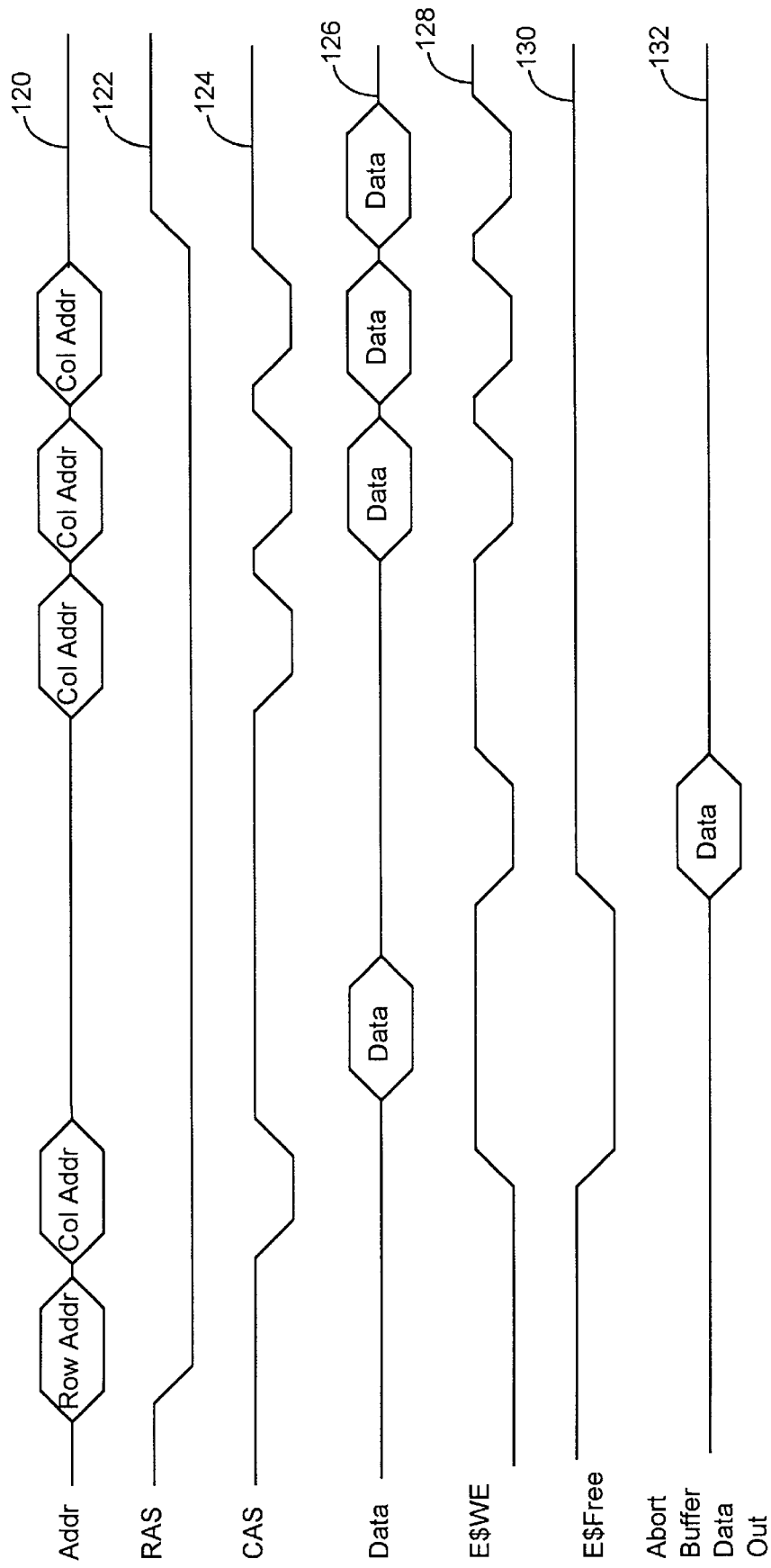

APPARATUS AND METHOD TO EFFICIENTLY ABORT AND RESTART A PRIMARY MEMORY ACCESS

BRIEF DESCRIPTION OF THE INVENTION

This invention relates generally to techniques for accessing a primary memory of a computer. More particularly, this invention relates to a Central Processing Unit (CPU) of a computer with an external cache controller and a primary memory controller operating to efficiently abort and restart primary memory accesses for the purpose of improving overall primary memory access times.

BACKGROUND OF THE INVENTION

FIG. 1 is an illustration of a general purpose computer 20. The computer 20 includes a central processing unit (CPU) 22. The CPU 22 executes instructions of a computer program. Each instruction is located at a memory address. Similarly, the data associated with an instruction is located at a memory address. The CPU 22 accesses a specified memory address to fetch the instruction or data stored there.

Most CPUs include an on-board memory called a cache. The cache stores a set of memory addresses and the instructions or data associated with the memory addresses. If a specified address is not in the internal, or L1 cache, then the CPU 22 looks for the specified address in an external cache, also called an L2 cache 24. The external cache 24 has an associated external cache controller 26.

If the address is not in the external cache 24 (a cache miss), then the external cache 24 requests access to a system bus 28. When the system bus 28 becomes available, the external cache 24 is allowed to route its address request to the primary memory 30. The primary memory 30 has an associated memory controller 32. The memory controller 32 queries the primary memory 30 for the subject address. If the subject address exists in primary memory 30, the data output from the primary memory 30 is applied to the system bus 28. It is then stored in the external cache 24 and is passed to the CPU 22 for processing.

The foregoing processing must be performed for every address request. Indeed, if the address request is not found in the primary memory 30, similar processing is performed by an input/output controller 34 associated with a secondary memory 36.

As shown in FIG. 1, there are additional devices connected to the system bus 28. For example, FIG. 1 illustrates an input/output controller 38 operating as an interface between a graphics device 40 and the system bus 28. In addition, the figure illustrates an input/output controller 42 operating as an interface between a network connection circuit 44 and the system bus 28.

The multiple connections to the system bus 28 result in a relatively large amount of traffic. Consequently, there are delays associated with passing information on the system bus 28. System bus 28 delays discourage optimizations of the memory controller 32 that require the passing of information to the CPU 22 or external cache controller 26. For example, the primary memory controller 32 requests access to the system bus 28 after it has retrieved data. It then attempts to pass the data to the external cache controller 26. If the external cache controller 26 cannot receive the data because it is busy processing another task, the primary memory controller 32 may store the entire set of retrieved data or it may throw it away and fetch the same data at a later time. Storing the data associated with the address requires a memory queue. This adds to system expense and complexity. Throwing the data away and then retrieving it again is relatively time consuming.

It is not feasible for the primary memory controller 32 to check the status of the external cache controller 26 during a memory access because such an operation requires relatively time consuming system bus 28 access. Moreover, it increases system bus traffic. It is also unrealistic to rely upon additional control lines between the external cache controller 26 and the primary memory controller 32. It is important to reduce the number of pins associated with a circuit, thus using additional signal lines for memory controller optimizations is not a practical option.

In view of the foregoing, it would be highly desirable to improve primary memory access times. The performance improvements should not increase system complexity, involve additional traffic on the system bus, or require additional package lines.

SUMMARY OF THE INVENTION

The invention improves primary memory access times through an efficient technique of aborting and restarting primary memory accesses. A central processing unit of a computer includes an external cache controller to selectively generate an external cache free signal and an external cache busy signal. The central processing unit also includes a primary memory controller with an abort buffer. The primary memory controller includes circuitry to abort a primary memory access in response to the external cache busy signal. The data segment retrieved prior to aborting the primary memory access is stored in the abort buffer. The primary memory controller restarts the primary memory access in response to the external cache free signal. The restarting operation results in the data segment being passed to the external cache controller. Thereafter, the remaining data associated with the primary memory access is retrieved and sent to the external cache controller.

The invention efficiently improves primary memory access times in a number of ways. First, the invention stores data retrieved prior to the abort operation. Preferably, the data is stored in an abort buffer that is limited to a fraction of the total data that will be returned during the memory access. Such an implementation is space efficient and easy to implement. The remaining data associated with the memory access is efficiently retrieved by keeping the Row Access Strobe signal deasserted until the memory access is completed. In this way, the time overhead of re-applying the same row address is avoided. The invention exploits the close coupling of the external cache controller and the primary memory controller on the central processing unit. Thus, the invention achieves improved memory access times without populating the system bus with additional traffic and without requiring additional signal pins.

BRIEF DESCRIPTION OF THE DRAWINGS

For a better understanding of the nature and objects of the invention, reference should be made to the following detailed description taken in conjunction with the accompanying drawings, in which:

FIG. 5 is a set of waveforms illustrating an aborted and re-initiated primary memory access in accordance with an embodiment of the invention.

Like reference numerals refer to corresponding parts throughout the several views of the drawings.

DETAILED DESCRIPTION OF THE INVENTION

Figure 1:
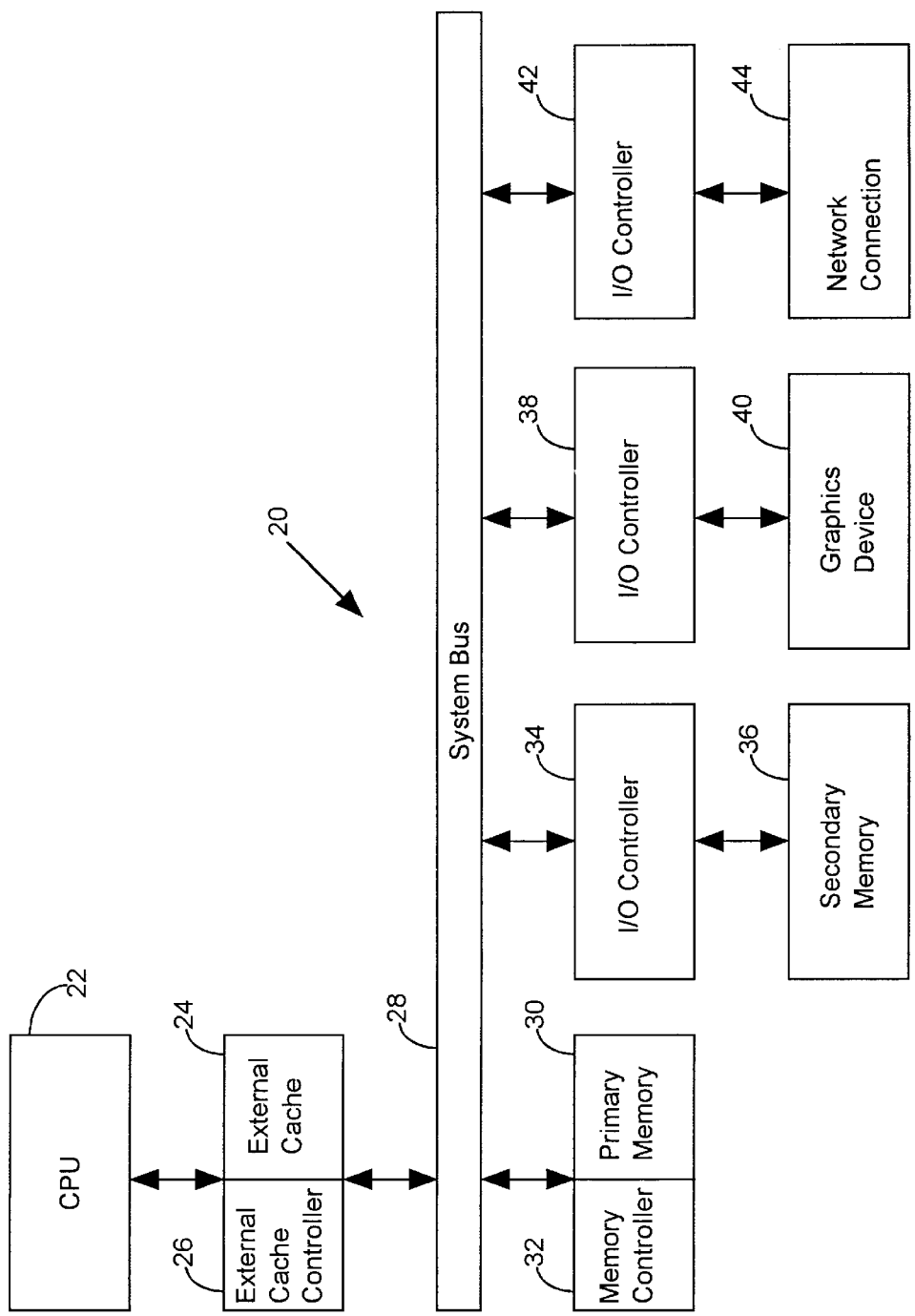
FIG. 1 illustrates a general purpose computer in accordance with the prior art.
Figure 2:
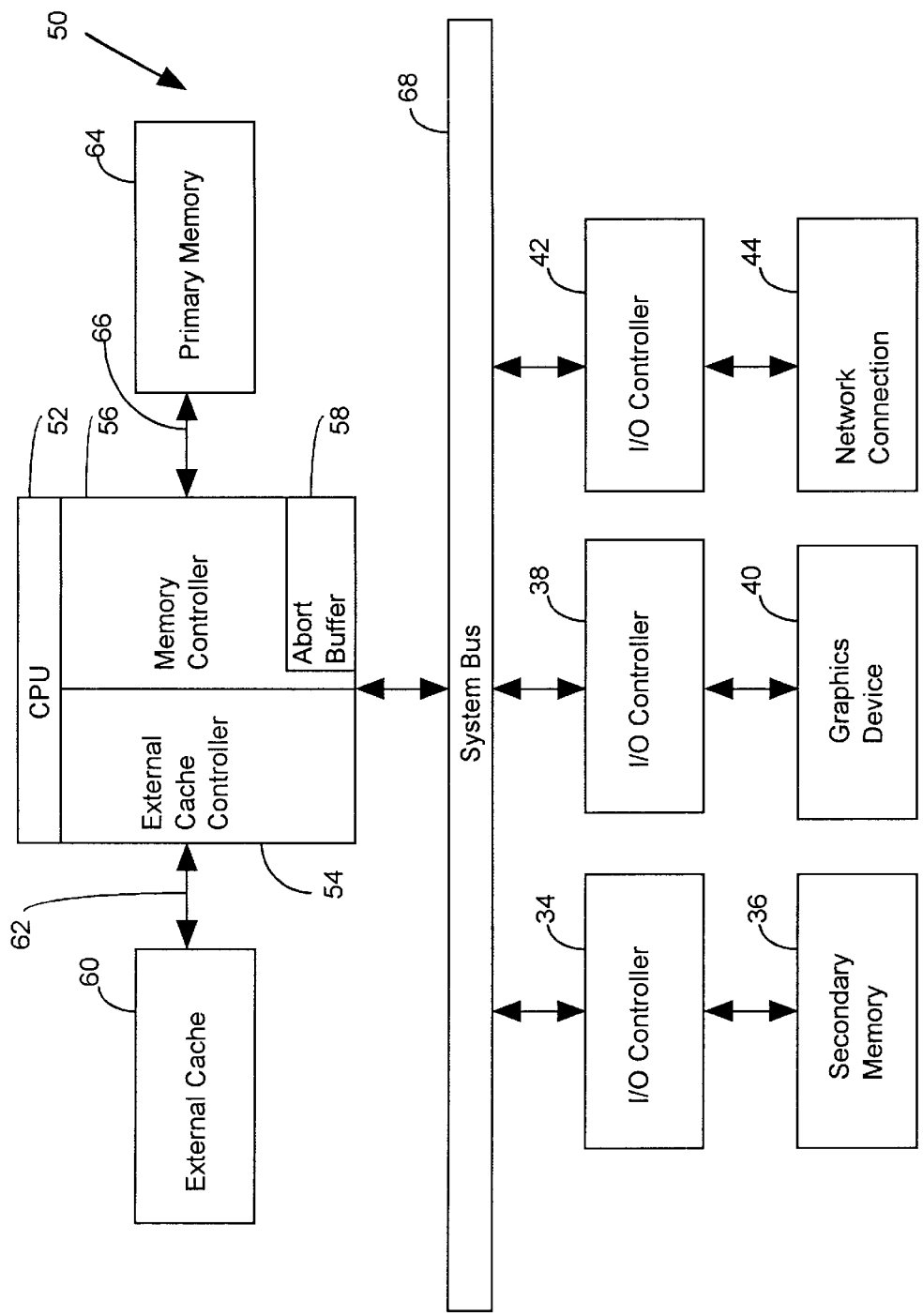
FIG. 2 illustrates a general purpose computer incorporating a Central Processing Unit in accordance with the invention.

FIG. 2 illustrates a general purpose computer 50 incorporating a CPU 52 formed in accordance with an embodiment of the invention. The CPU 52 includes an external cache controller 54 and a primary memory controller 56. The primary memory controller 56 includes an abort buffer 58, the operation of which is discussed below. The external cache controller 54 is attached to an external cache via bus 62, while the primary memory controller 56 is attached to the primary memory 64 via the bus 66. The computer 50 also includes a system bus 68 with connections to various input/output controllers 34, 38, and 42. The input/output controllers are respectively connected to a secondary memory 36, a graphics device 40, and a network connection 44.

Figure 3:
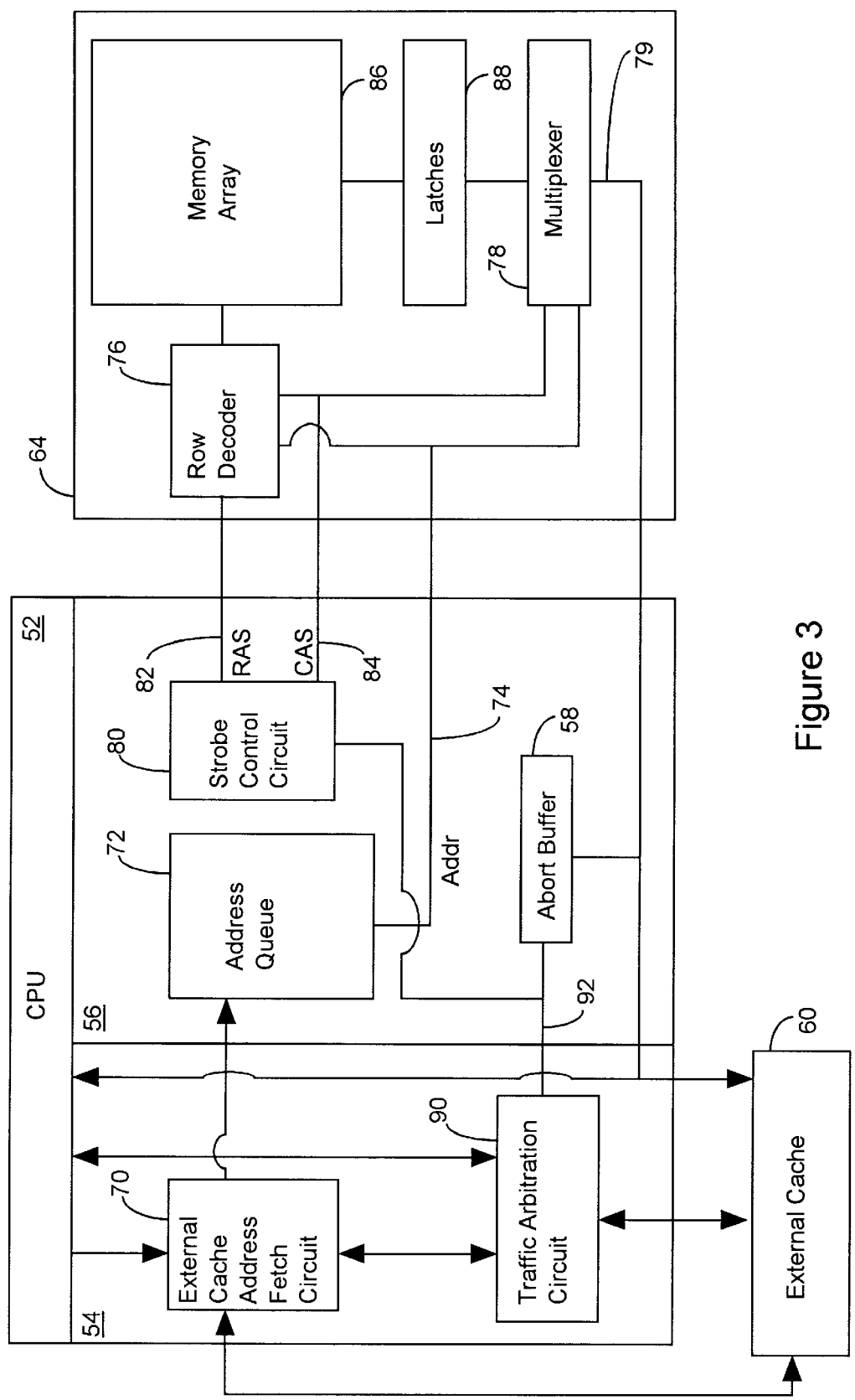
FIG. 3 illustrates a Central Processing Unit with an on-board external cache controller and an on-board primary memory controller including an abort buffer, in accordance with one embodiment of the invention.

FIG. 3 is a detailed illustration of the CPU 52 and its associated external cache controller 54 and primary memory controller 56. The external cache controller 54 receives address requests from the CPU 52 at an external cache address fetch circuit 70. The fetch circuit 70 operates in a standard manner to query the external cache 60 for the requested addresses. If a requested address does not exist in the external cache 60, then the fetch circuit 70 routes it to an address queue 72 of the primary memory controller 56. An address from the queue 72 is applied to the bus 74, which routes the address to a row decoder 76 and a multiplexer 78 of the primary memory 64.

A strobe control circuit 80 of the memory controller 56 is used to enable either the row decoder 76 or the multiplexer 78. In particular, the row decoder 76 generates a Row Access Strobe (RAS) signal on line 82 or a Column Access Strobe (CAS) signal on line 84.

When an address and the RAS signal are applied to the row decoder 76, the row decoder 76 specifies a row of values in a memory array 86. The row of values, also called a memory page, is then passed into a set of latches 88. Selected columns from the row (or page) of data are then specified with the address signal. That is, a subsequent address signal is used to specify selected columns in the row. The subsequent address signal is used as a multiplexer select signal, enabled by the CAS signal. Thereafter, the multiplexer 78 generates a data output signal on an output bus 79.

Figure 4:
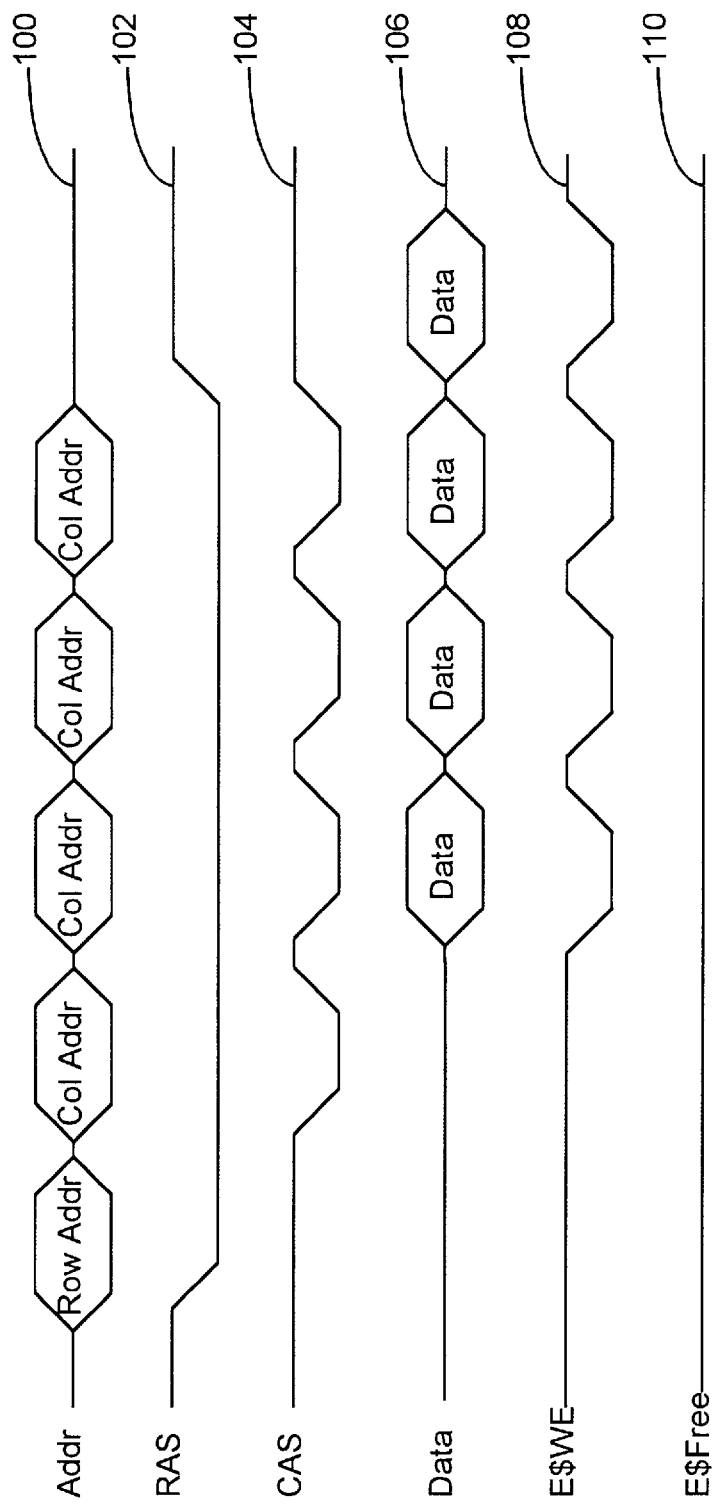
FIG. 4 is a set of waveforms illustrating the fetching of data in accordance with an embodiment of the invention.

The foregoing operation is more fully appreciated with reference to FIG. 4. Waveform 100 illustrates a row address being asserted, followed by a set of column addresses. These signals are applied to the bus 74 of FIG. 3. The same bus 74 is used for both the row and column address in order to save package pins and thereby reduce package costs. The row address (Row Addr) is routed to the row decoder 76 as the RAS signal is deasserted, as shown with the waveform 102 going from high to low. The combination of the row address and the deasserted RAS signal allows the row decoder 76 to access a row in the memory array 86, resulting in the row of data being driven into the latches 88.

A first set of data is then read from the latches 88 with the multiplexer 78, as a first column address and a deasserted CAS signal is received at the multiplexer 78. The first deassertion of the CAS signal is shown with the waveform 104. The first deassertion of the CAS signal coincides with the timing of the first column address, as shown in FIG. 4. This operation results in a first set of output data being driven onto the bus 79. The first set of output data is shown with the waveform 106. The RAS signal continues to be deasserted, shown with the waveform 102, as the subsequent column address signals, shown with the waveform 100, are applied to the multiplexer 78. The subsequent column address signals are timed to coincide with the deassertion of the CAS signal, as shown with the waveform 104. This operation produces three subsequent sets of data. Depending upon the system, the data of the waveform 106 may not be returned until after the second, third, or fourth column address is asserted. A relatively fast data return is illustrated for the sake of convenience.

Note that after the last column address is sent, the RAS signal is asserted (goes high) once again. If a new address is to be fetched from primary memory, the RAS signal must be deasserted again, and the foregoing processing must be repeated. The operation of asserting and deasserting the RAS signal consumes several clock cycles. In addition, the driving of a row address to the primary memory 64 consumes several clock cycles. It would be highly desirable to improve the processing associated with a primary memory by eliminating this overhead. Such an improvement would be especially important because primary memory latencies are not improving as much as CPU speeds. Thus, primary memory latencies are increasingly reducing the execution performance of CPUs.

FIG. 3 illustrates that the output bus 79 extends to the CPU 52 and the external cache 60. If the traffic arbitration circuit 90 determines that the external cache 60 is available for writing data, then it generates a digital high external cache free signal, illustrated in FIG. 4 with waveform 110. The external cache free signal is applied to line 92 to prevent the abort buffer 58 from storing any data from the bus 79. When the external cache is free, the traffic arbitration circuit 90 also disables an external cache write enable signal, shown with waveform 108 in FIG. 4, which allows the data on bus 79 to be written into the external cache 60.

There are a number of features to note about the invention at this point. First, the traffic arbitration circuit 90 has an associated external cache free signal that is applied to the abort buffer 58. The external cache free signal is shown in FIG. 4 as a digital high signal. When the digital high signal goes low, an external cache busy signal can be said to exist. Naturally, the polarity of the signal can be reversed. The external cache free/busy signal is generated on the external cache controller 54 of the CPU 52 and is applied to the abort buffer 58 of the primary memory controller 56 of the CPU 52. Thus, the invention exploits the close coupling of the external cache controller 54 and the primary memory controller 56. The communication between these devices is instantaneous, it does not require additional traffic on the system bus 68, and it does not require valuable package pins.

In the discussion in reference to FIG. 4, the external cache was free, thus the abort buffer 58 was not used. FIG. 5 includes a set of timing diagrams illustrating the operation of the abort buffer 58 when the external cache 60 is busy.

The first waveform 120 of FIG. 5 illustrates a row address signal and a column address signal being sequentially applied to the address bus 74. The RAS signal is then deasserted, as shown with waveform 122. A short time later, the CAS signal is deasserted as the first column address signal is generated, as shown with waveform 124.

FIG. 5 illustrates that as the first CAS signal is being deasserted, the external cache free signal goes from a digital high value to a digital low value, as shown with waveform 130. This indicates that the external cache 60 is busy and therefore data cannot be written to it. As indicated above, the external cache free signal is applied to line 92. The abort buffer 58 uses this signal as a write enable signal. That is, when the signal is low, it reads the data on the bus 79. Thus, the first block of data returned by the memory access, shown in waveform 126, is latched into the abort buffer 58.

The external cache free signal is also routed to the strobe control circuit 80 via line 92. When the strobe control circuit 80 observes the signal as a digital low value, it stops deasserting the CAS signal. Thus, waveform 124 is illustrated as a digital high value after the first deassertion signal for the first column address. This operation prevents additional column addresses from being processed. Consequently, the primary memory 64 does not return any more data. In other words, in response to the external cache busy signal (the external cache free signal as a digital low) the primary memory access is halted after the return of the first data segment. This first data segment is then stored in the abort buffer 58.

Preferably, the first data segment stored in the abort buffer 58 is the data segment that is initially required by the CPU 52. In other words, if a single row address and four column addresses are to be applied to primary memory, the strobe control circuit 80 selects the most critical column address for initial processing. The most critical column address is the column address that is used to retrieve the data that must be processed by the CPU 52 first. The data corresponding to the most critical column address is then retrieved and stored in the abort buffer 58. Consequently, this critical data can be quickly processed by the CPU 52 with minimal delay.

FIG. 5 illustrates that the external cache free signal returns to a digital high value after a short period of time. The abort buffer 58 observes the external cache free signal on line 92 going from low to high. In response to the high signal, it releases the first data segment it is storing onto the bus 79.

The data released from the abort buffer 58 is shown with waveform 132. The traffic arbitration circuit 90 deasserts the external cache write enable signal as the first data segment is released form the abort buffer 58. This operation is shown with waveform 128.

The toggling of the external cache free signal from a digital low to a digital high is also observed by the strobe control circuit 80. This causes the strobe control circuit 80 to deassert the CAS signal for the remaining column addresses, as shown with waveform 124.

Note that the strobe control circuit 80 deasserted the RAS signal the entire time that the external cache was busy. Thus, in accordance with the invention, the memory access was aborted, but it was restarted without reasserting the same row address once again. Moreover, the aborting of the memory access did not result in a loss of the most critical segment of data that is retrieved for a given row address.

Waveform 126 of FIG. 5 illustrates the remaining data being returned after the deassertion of the CAS signals 124. Waveform 128 shows the deassertion of the external cache write enable signal as the data is being generated, which allows the data to be written to the external cache.

Those skilled in the art will recognize a number of benefits associated with the disclosed scheme. The invention provides an efficient way to abort and restart a primary memory access. The abort buffer 58 is preferably implemented to store a fraction (preferably approximately a quarter or less) of the data associated with the memory access. This allows the abort buffer 58 to be implemented with minimal memory requirements and minimal control circuitry. The critical data returned is sufficient for initial processing as the remaining data of the memory access is retrieved.

The close coupling of the external cache controller 54 and the primary memory controller 56 on the CPU 52 allows the invention to be implemented without additional traffic on the system bus 68 and without additional package pins.

Advantageously, the invention can be readily incorporated into known external cache controller and primary memory controller architectures. Most existing external cache controllers have some type of traffic arbitration circuit. Such a circuit merely needs to be modified to generate an external cache free signal that is applied to the abort buffer 58 and the strobe control circuit 80. A standard strobe control circuit 80 can be readily modified to respond to the external cache free signal in a manner previously described. In particular, a standard strobe control circuit is modified to keep the RAS signal deasserted until the last column address is driven. In addition, such a circuit is modified to assert (a digital high signal preventing the processing of additional column addresses) the CAS signal when the external cache is busy. When the external cache is freed once again, the strobe control circuit 80 deasserts the CAS signal for the remaining column addresses. This operation is commenced a predetermined period of time after the external cache free signal transitions so that there is sufficient time to vacate the data from the abort buffer 58 and write it to the external cache.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A central processing unit of a computer, comprising:
an external cache controller to selectively generate an external cache free signal and an external cache busy signal; and
a primary memory controller including an abort buffer, said primary memory controller including:
circuitry to abort a primary memory access in response to said external cache busy signal and store, in said abort buffer, a data segment generated by said primary memory access before said abort operation, wherein said circuitry to abort said primary memory access includes a strobe control circuit to eliminate a column strobe to primary memory, and
circuitry to restart said primary memory access in response to said external cache free signal by passing said data segment to said external cache controller and passing the remaining data associated with said primary memory access to said external cache controller, wherein said circuitry to restart said primary memory access includes a strobe control circuit to continuously apply a row strobe signal to primary memory.

2. The apparatus of claim 1 wherein said abort buffer is configured to store less than a quarter of the data retrieved by said primary memory access.

3. The apparatus of claim 1 wherein said circuitry to restart said primary memory access includes a strobe control circuit to apply a column address signal to primary memory in response to said external cache free signal.

4. The apparatus of claim 1 wherein said external cache controller includes a traffic arbitration circuit to selectively generate said external cache free signal and said external cache busy signal.

5. The apparatus of claim 1 further comprising an external cache memory connected to said external cache controller.

6. The apparatus of claim 1 further comprising a primary memory connected to said primary memory controller.

7. The apparatus of claim 6 wherein said primary memory is a Dynamic Access Memory.

8. The apparatus of claim 1 further comprising a system bus connected to said central processing unit.

9. The apparatus of claim 8 further comprising a plurality of input/output controllers connected to said system bus.

10. A method of aborting and restarting a primary memory access, said method comprising the steps of:

selectively generating an external cache free signal and an external cache busy signal, aborting a primary memory access in response to said external cache busy signals wherein said aborting step includes the step of eliminating a column strobe signal to primary memory;

storing a data segment retrieved by said primary memory access before said aborting step;

passing said data segment in response to said external cache free signal; and completing said primary memory access in response to said external cache free signal, wherein said completing step includes the step of continuously applying a row strobe signal to primary memory.

11. The method of claim 10 wherein said storing step includes the step of storing less than a quarter of the data retrieved by said primary memory access.

12. The method of claim 10 wherein said completing step includes the step of applying a column address signal to primary memory in response to said external cache free signal.

* * * * *